May 31, 1960    J. K. CAMPBELL    2,938,557
KNIFE MOUNTING FOR FLYWHEEL TYPE FORAGE HARVESTERS
Filed Aug. 28, 1958
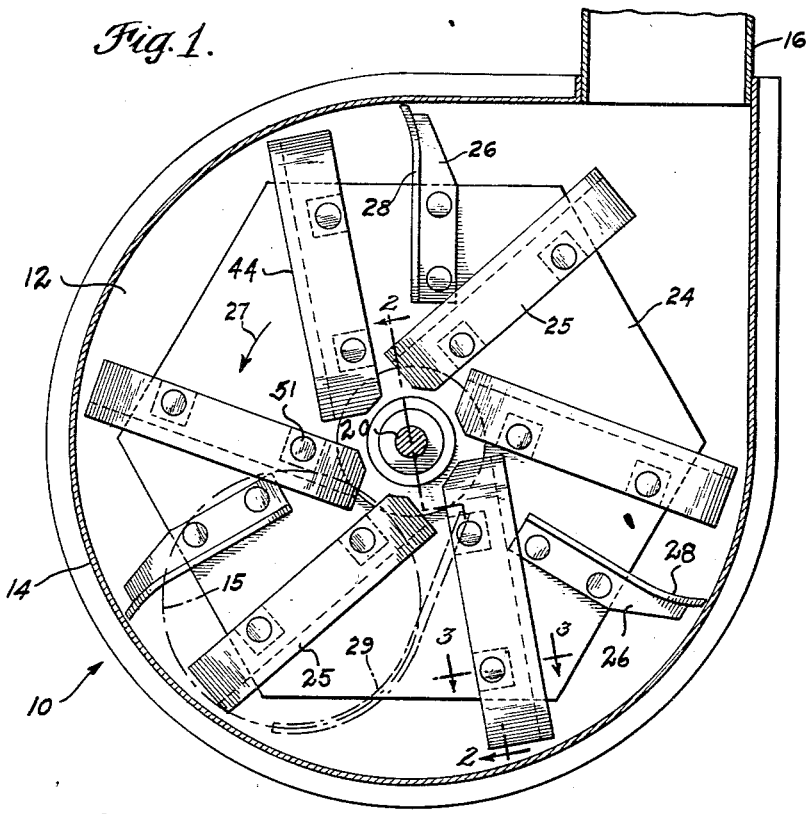
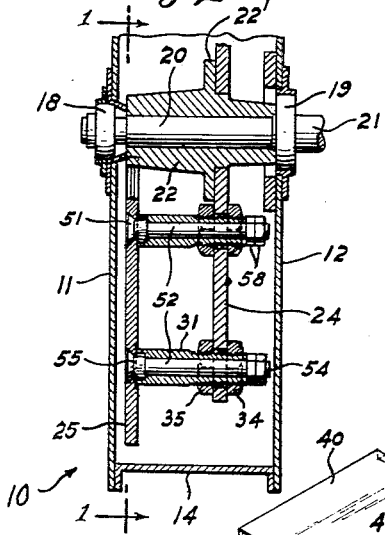
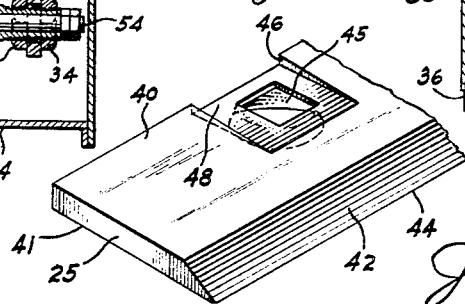
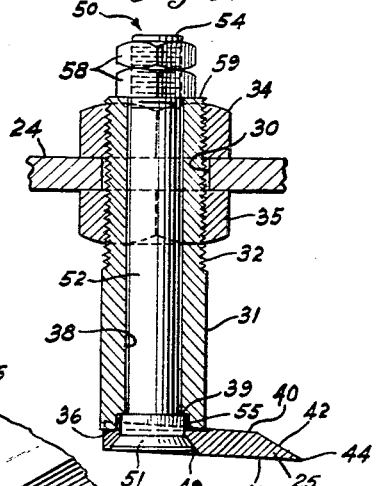
INVENTOR
JOSEPH K. CAMPBELL
Joseph Allen Brown
ATTORNEY

United States Patent Office 2,938,557
Patented May 31, 1960

2,938,557

KNIFE MOUNTING FOR FLYWHEEL TYPE FORAGE HARVESTERS

Joseph K. Campbell, New Holland, Pa., assignor to Sperry Rand Corporation, New Holland, Pa., a corporation of Delaware Filed Aug. 28, 1958, Ser. No. 757,822

3 Claims. (Cl. 146—107)

This invention relates generally to forage harvesters, and more particularly to a structure for mounting knives in a flywheel type forage harvester.

In flywheel type forage harvesters, as shown for example in West U.S. Patent No. 2,848,029, issued August 19, 1958, the cutting knives extend generally radially relative to the rotational axis of the flywheel. Each knife has a leading end and a trailing end, the leading end having a cutting edge. The knives cooperate successively with a stationary shear bar over which crop material is fed from a suitable pick up and conveying mechanism. Usually, the flywheel is disposed in a housing having a tangential discharge outlet, and is provided with fan blades which coact with the cut material to whirl it around the housing and discharge it through such outlet.

The mounting for each knife must be such that the cutting edge of the knife passes the shear bar with a close clearance whereby material will be severed. However, the trailing end of the knife must be set back, as shown in Fig. 3 in the above-mentioned patent. Otherwise, the entire side of the knife will pass along the shear bar instead of just the cutting edge creating clearance problems.

The mounting of knives on a flywheel so that only a cutting edge will operate along a shear bar can be accomplished by providing knives of various configurations, such as bowed or tapered. However, such configurations substantially increase manufacturing costs. When it is considered that a flywheel type forage harvester may have six knives, for example, variations in the costs of different knife mounting structures can mean a substantial difference in the ultimate cost of the machine. It is preferred from a cost standpoint that the knives be made from simple, readily available bar stock, cut to length and beveled along one edge to provide a cutting edge.

Heretofore, bar stock knives have been mounted as shown in Fig. 3 in the West patent. Knife carrying stud members are cut off at an angle at one end to provide supporting surfaces inclined relative to the axes of the studs. That is, the supporting surfaces extend other than perpendicular relative to the stud axes. Mounting the knives on such studs causes difficulties in that when the knives are adjusted on the flywheel, the studs sometimes become rotated out of position. When the bolts for mounting the knives are tightened, the knives become distorted because of improper seats. Distortion of the knives affects the clearance with the shear bar. It is necessary, therefore, that at all times each mounting stud be in a given, proper, angular position, otherwise a faulty knife seat will result. This, however, is difficult to obtain because when the nuts on the fastening bolts are tightened they tend to impart a rotatable movement to the supporting studs.

One object of this invention is to provide an improved knife support of the character described wherein the rotatable position of the mounting stud is immaterial.

Another object of this invention is to provide a knife support of the character described which is of simple construction yet achieves a desired end at low cost.

A further object of this invention is to provide, in a flywheel type forage harvester, knives made of conventional bar stock and readily mountable for cooperation with a stationary shear bar.

Other objects of this invention will be apparent hereinafter from the specification and from the recital in the appended claims.

In the drawing:

Fig. 1 is a transverse vertical section through the housing of a flywheel type forage harvester having knives mounted according to this invention, such section being taken on the line 1—1 of Fig. 2 and looking in the direction of the arrows;

Fig. 2 is a section taken on the line 2—2 of Fig. 1 and looking in the direction of the arrows;

Fig. 3 is an enlarged fragmentary section taken on the line 3—3 of Fig. 1 and looking in the direction of the arrows; and Fig. 4 is a perspective view of one end of one of the knives.

Referring now to the drawing by numerals of reference, 10 denotes a conventional cylindrical cutter-blower housing fixedly carried on a supporting frame, not shown. Housing 10 has a pair of parallel side walls 11 and 12 (Fig. 2) interconnected by a semi-circular band 14. Material to be chopped and blown is delivered into the housing through an inlet opening 15, indicated by the dotted circle in Fig. 1. Such opening is in side wall 11. After being chopped, material is blown from housing 10 through a tangential discharge spout or outlet 16.

Mounted on side walls 11 and 12 are bearings 18 and 19 which support a shaft 20 having an end 21 projecting through wall 12 and connected to a source of rotatable power, not shown. Keyed or otherwise affixed to shaft 20 is a hub 22 having an annular flange 22' to which a disc or plate 24 is connected.

Carried on plate 24 and extending generally radially relative to the axis of the shaft 20 are six knives 25, angularly spaced, and three fan elements 26 disposed between every other pair of knives. The fan elements have leading faces 28, relative to the direction of rotation of plate 24 indicated by arrow 27. Such faces extend between the side walls 11 and 12 to impart a blowing and throwing action on the material in the housing 10. The knives, on the other hand, are mounted spaced from the plate 24 toward the wall 11. Each knife is similarly mounted and spaced from plate 24 to allow for the passage of material therebetween. The knives cooperate successively with a stationary shear bar or ledger plate 29, Fig. 1, suitably mounted at the inlet to the housing 10 and having a portion partially surrounding the opening 15.

The above structure is more or less conventional, applicant's invention residing in the means for supporting the knives 25. As previously stated, it is necessary that the leading or cutting edges of the knives be disposed for cooperation with the shear bar while the trailing ends of the knives are spaced therefrom when the plate 24 is rotated. Each knife is mounted by two radially spaced supports. All the supports are identical. One support, as shown in detail in Fig. 3, will now be described.

Plate 24 has a hole 30 punched through it. Extendable through the hole is a stud 31 having a threaded shank 32 onto which a pair of adjusting nuts 34 and 35 are carried, one on each side of plate 24. It will be apparent that by loosening one nut and tightening the other stud 31 can be adjusted axially relative to plate 24. Stud 31 is tubular in form, and it extends from plate 24 toward the side wall 11. The stud has an end 36 which provides a supporting surface which is perpendicular to the longitudinal axis of the stud. The bore 38 of the stud is countersunk at the end 36 as shown at 39.

As shown in Fig. 4, each knife 25 has a pair of parallel side faces 40 and 41, and one longitudinal edge of the knife is beveled at 42 to provide a cutting edge 44. Each knife 25 is made from conventional bar stock.

Each knife 25 is provided with a square hole 45 adapted to register with the bore 38 in stud 31. In this same area, each knife is cutaway at 46 to provide a flat surface 48 inclined relative to sides 40–41. Such cutaway is in the side 40 and extends from a point toward the cutting edge 44 to the trailing edge of the knife. Further, each knife has a beveled countersunk portion 49. The axis of hole 45 and countersunk portion 49 is perpendicular to surface 48.

Each end of knife 25 is adapted to be connected to the plate 24 by a bolt 50 having a head 51 at one end which fits into portion 49, a shank 52 which extends completely through the stud 31 and is threaded at its outer end 54. Between head 51 and shank 52 is a square neck portion 55 which fits into the square hole 45 in the knife 25 to prevent relative turning between the knife and the bolt. Threaded on the end 54 of the bolt are a pair of lock nuts 58 which thread against the end 59 of stud 31.

When mounted, the knife assumes the position shown in Fig. 3 wherein the side faces 40 and 41 extend at an angle relative to the longitudinal axis of the stud. The incline of the knife is determined by the incline of surface 48 provided by the cutaway 46. With this structure, the rotatable position of the stud 31 is completely immaterial. If the stud rotates when the knife is being mounted or adjusted, no harm is done.

When the flywheel is rotated, the cutting edges 44 of the knives pass closely and cooperate with the shear bar 29. However, the trailing edges of the knives will be spaced from the shear bar.

While this invention has been described in connection with a particular embodiment thereof, it will be understood that it is capable of further modification, and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. A stud having a longitudinal axis and an end providing a supporting surface perpendicular to said axis, a knife mountable on said stud end, said knife having a pair of sides which extend parallel to each other, one of said sides facing said stud and the other side being remote therefrom, a seat in said one side having a flat surface inclined relative to said knife sides, and means for connecting said knife to said stud with said end engaging said inclined seat whereby said knife sides extend angularly relative to the stud ends.

2. A tubular stud having a longitudinal axis and one end of the stud providing a supporting surface perpendicular to said axis, a knife mountable on said one end, said knife having a pair of sides which extend parallel to each other, one of said sides facing said stud and the other side being remote therefrom, a seat in said one side having a flat surface inclined relative to said knife sides, said knife having an opening extending from said seat to said remote side, a bolt extending through said knife opening and said stud and having a threaded end projecting beyond the end of the stud opposite said one end, a nut threaded on said threaded end, said bolt having a head and a shank interconnected by a neck portion, said neck portion projecting through said opening and the configuration of the neck and opening being such as to prevent twisting of the bolt relative to the knife.

3. A tubular stud having a longitudinal axis and one end of the stud providing a supporting surface perpendicular to said axis, a knife mountable on said one end, said knife having a pair of sides which extend parallel to each other, one of said sides facing said stud and the other side being remote therefrom, a seat in said one side having a flat surface inclined relative to said knife sides, said knife having an opening extending from said seat to said other side, said opening having an axis perpendicular to said flat seat and being countersunk from said other side, a bolt extending through said knife opening and said stud, said bolt having a head which seats in the countersunk portion of said opening, a neck which projects through the opening, and a shank which projects beyond the end of the stud opposite said one end, the projecting portion of said shank being threaded, a pair of lock nuts threaded on said projecting portion, and the configuration of said neck and said opening being such as to prevent turning of said bolt relative to said knife.

References Cited in the file of this patent
UNITED STATES PATENTS

| 2,656,868 | Hintz et al. | Oct. 27, 1953 |
| 2,657,513 | Martin | Nov. 3, 1953 |
| 2,771,111 | Seyfried | Nov. 20, 1956 |